United States Patent

[11] 3,594,987

[72] Inventors Kenzo Oda
Higashiyodogawa-ku;
Takashi Ohara, Akashi-shi; Kazuhide Sato, Kominato-machi, Naka-ku; Takashi Mori, Minami-ku, all of, Japan
[21] Appl. No. 454,758
[22] Filed Sept. 28, 1964
[45] Patented July 20, 1971
[73] Assignees Nippon Shokubai Kagaku Kogyo Co., Ltd.
Osaka, Japan;
Japan Gasoline Co., Ltd.
Tokyo, Japan
[32] Priority Sept. 27, 1963
[33] Japan
[31] 38/51486

[54] METHOD OF RECOVERING AMMONIA GAS FROM AQUEOUS SOLUTION CONTAINING AMMONIA AND CARBON DIOXIDE
2 Claims, 1 Drawing Fig.
[52] U.S. Cl. .................................................. 55/53, 55/70, 260/465 C, 260/555
[51] Int. Cl. .................................................. B01d 19/00
[50] Field of Search .......................................... 260/465.3, 465 C, 555; 23/193; 55/53, 68, 70

[56] References Cited
UNITED STATES PATENTS

| | | | |
|---|---|---|---|
| 2,046,827 | 7/1936 | Lawrence et al. | 260/555 |
| 2,087,325 | 7/1937 | Lawrence et al. | 260/555 |
| 2,327,333 | 8/1943 | Kirkpatrick | 260/555 |
| 3,137,724 | 6/1964 | Guyer et al. | 260/555 |
| 3,287,407 | 11/1966 | Zardi | 260/555 |
| 3,112,177 | 11/1963 | Fujise et al. | 23/193 X |
| 3,255,233 | 6/1966 | Kunze et al. | 260/465.3 |
| 3,262,962 | 7/1966 | McDaniel et al. | 260/465.3 |
| 3,282,860 | 11/1966 | McDaniel et al. | 260/465.3 |

*Primary Examiner*—Joseph Paul Brust
*Attorney*—Nathaniel L. Leek

ABSTRACT: A process for recovering ammonia gas from an aqueous solution containing ammonia and carbon dioxide which comprises countercurrently contacting such aqueous solution with a desorption gas selected from air, oxygen, nitrogen and mixtures thereof. The molar ratio of ammonia to carbon dioxide in the aqueous solution is at least 2, such aqueous solution being one obtained upon the synthesis of urea from ammonia and carbon dioxide or from the production of an aromatic nitrile by the ammoxidation of an aromatic hydrocarbon.

PATENTED JUL27 1971
3,594,987
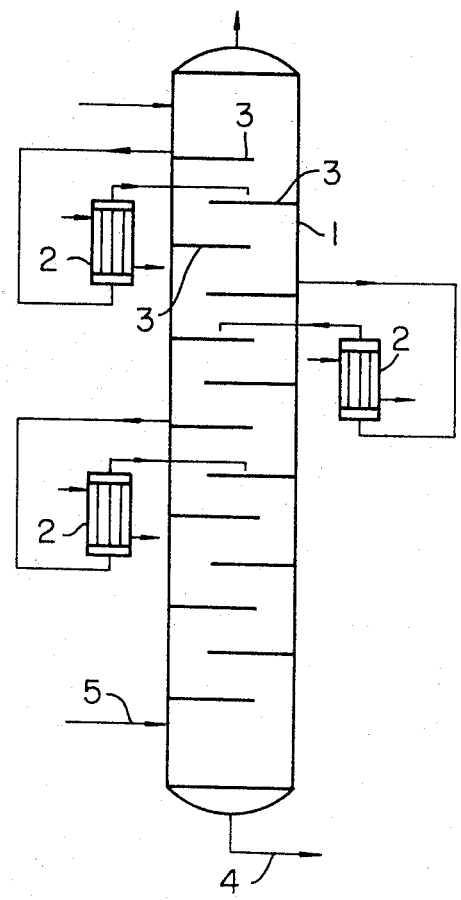
INVENTORS
KENZO ODA
TAKASHI OHARA
KAZUHIDE SATO
TAKASHI MORI
BY
ATTORNEY

METHOD OF RECOVERING AMMONIA GAS FROM AQUEOUS SOLUTION CONTAINING AMMONIA AND CARBON DIOXIDE

This invention relates to a method of recovering ammonia gas selectively from an aqueous solution containing ammonia and carbon dioxide and, more particularly, to a method of recovering ammonia gas which is substantially free from carbon dioxide by contacting an aqueous solution containing ammonia and carbon dioxide in which a molar ratio of ammonia to carbon dioxide is more than two with a desorption gas, such as air or nitrogen, which does not react with ammonia and carbon dioxide and is substantially water-insoluble, at a temperature below about 60° C. and above the freezing point of said aqueous solution, usually in the range of about 0° to 60° C., and thereafter desorbing ammonia gas selectively from said aqueous solution.

In the synthesis of urea from ammonia and carbon dioxide or that of nitriles by oxidation of hydrocarbons with molecular oxygen in the presence of ammonia (ammoxidation), a gaseous mixture containing great quantities of carbon dioxide and unreacted or by-produced ammonia is formed. In order to carry out such synthesis with commercial advantage, therefore, it is of paramount importance to recover these components and utilize them effectively.

Various techniques suitable for the above purposes have been proposed up to date as a method of recovering ammonia and carbon dioxide, in combination or separately, from such gaseous mixture.

One of such methods comprises scrubbing a gaseous mixture containing ammonia and carbon dioxide with water to get an aqueous solution of ammonia and carbon dioxide, contacting an aqueous solution of a $CO_2$ fixing agent such as organic and inorganic base or basic salt, for instance, caustic alkali, amines and alkali carbonate, with said aqueous solution of ammonia and carbon dioxide to fix selectively and reversibly carbon dioxide or carbonate ion dissolved in it and thereafter desorbing ammonia selectively. Another method of recovering ammonia comprises washing a gaseous mixture containing ammonia and carbon dioxide directly with an aqueous solution of a $CO_2$ fixing agent such as organic and inorganic base or basic salt to remove selectively carbon dioxide or other acidic gases out of the gaseous mixture.

Since an aqueous solution of a $CO_2$ fixing agent such as organic and inorganic base or basic salt is required in stoichiometric amount in these methods, the consumption these chemical agents constitutes an unavoidable setback. Furthermore it sometimes involves the corrosion of an apparatus used.

An object of this invention is to provide an improved and economical method of recovering ammonia gas which is substantially free from carbon dioxide, overcoming technological drawbacks of the conventional methods, when ammonia gas is to be selectively recovered from an aqueous solution containing ammonia and carbon dioxide.

Another object of this invention is to provide a method of recovering ammonia gas which substantially free from carbon dioxide from an aqueous solution containing ammonia and carbon dioxide in which a molar ratio of ammonia to carbon dioxide is more than 2, which solution is obtained by scrubbing with water a gaseous mixture containing ammonia and carbon dioxide which is formed in the synthesis of urea or the manufacture of nitriles from hydrocarbons by ammoxidation. In the production of nitriles, especially aromatic nitriles from the corresponding hydrocarbons by ammoxidation, for instance in the production of benzonitrile from toluene or that of phthalonitriles from xylenes, a great quantity of unreacted ammonia is present in the product gas along with carbon dioxide.

It is especially important in the ammoxidation of aromatic hydrocarbons to recover ammonia is such manner that it may be most advantageously recycled to the reaction system.

According to this invention it is possible to desorb ammonia free from carbon dioxide from an aqueous solution containing $NH_3$ and $CO_2$ with the aid of air and/or oxygen as a desorption gas. The resulting gaseous mixture containing ammonia can be directly recycled to the ammoxidation reactor with further addition of feedstock hydrocarbon and fresh ammonia. Therefore, the method of this invention is particularly advantageous when applied to the manufacture of nitriles by oxidation of hydrocarbons with molecular oxygen in the presence of ammonia. It is of course applicable to the ammoxidation of aliphatic hydrocarbons.

In general, when gas is to be absorbed in a liquid medium, it is a general rule to select relatively low temperatures and high pressures as the operational condition. The amount of gas absorbed is maximized under that condition. On the other hand, when gas is to be desorbed from a solution which has absorbed the gas, the choice of high temperatures and low pressures is preferred.

However, when ammonia is desorbed at high temperatures from an aqueous solution containing ammonia and carbon dioxide in which a molar ratio of ammonia to carbon dioxide is more than two, carbon dioxide as well as ammonia is desorbed by the decomposition of a compound consisting of ammonia and carbon dioxide.

It is already known that in an aqueous solution in which ammonia and carbon dioxide are dissolved together, the partial pressures of ammonia and carbon dioxide in a gaseous phase which is present in equilibrium with the aqueous solution vary depending upon the change of temperature and molar ratio of ammonia to carbon dioxide. As an example, Tables 1 and 2 respectively show partial pressures at equilibrium of ammonia and carbon dioxide according to variations of a molar ratio of ammonia to carbon dioxide at constant temperature and those according to the change of temperature with a molar ratio of ammonia to carbon dioxide maintained constant both in respect of an aqueous solution in which the concentration of ammonia is 2 per litre.

Table 1

(Temperature 20° C.)

| Molar ratio in aqueous solution | Partial pressure of $NH_3$ in gaseous phase (mm. Hg) | Partial pressure of $CO_2$ in gaseous phase (mm. Hg) |
|---|---|---|
| $NH_3/CO_2=1.25$ | 0.7 | 80 |
| $NH_3/CO_2=5$ | 13.0 | 0.2 |

Table 2

($NH_3/CO_2=5.0$)

| Temperature of aqueous solution | Partial pressure of $NH_3$ in gaseous phase (mm. Hg) | Partial pressure of $CO_2$ in gaseous phase (mm. Hg) |
|---|---|---|
| 40.0 | 35 | 1.2 |
| 90.0 | 270 | 38.0 |

With the knowledge of the equilibrium, we have found that it is possible to recover ammonia gas substantially free from carbon dioxide, without the necessity of adding a $CO_2$ fixing agent as mentioned above, by contacting a desorption gas which does not react with ammonia and carbon dioxide and is substantially water-insoluble with an aqueous solution containing $NH_3$ and $CO_2$ in which a molar ratio of ammonia to carbon dioxide is more than two, at a temperature in the range where the decomposition of the compound consisting of ammonia and carbon dioxide is not appreciable, i.e., below 60° C. and above the freezing point of the aqueous solution.

Hence, this invention relates to the method of selectively recovering ammonia which comprises desorbing at relatively low temperatures ammonia which is substantially free from carbon dioxide from an aqueous solution containing ammonia and carbon dioxide in which a molar ratio of ammonia to carbon dioxide is more than two.

Such aqueous solution may contain a solvent such as methanol. It is to be understood, therefore, that the term "aqueous solution containing ammonia and carbon dioxide" used in this invention is a generic term for a solution of an aqueous medium capable of absorbing said gaseous mixture.

The molar ratio of ammonia to carbon dioxide should be more than 2, and there is no upper limit.

Other objects and advantages of this invention will become more apparent from the following description.

In accordance with the method of this invention, the feed aqueous solution is fully contacted with a desorption gas which does not react with ammonia and carbon dioxide and is substantially water-insoluble, and thereafter ammonia gas is selectively desorbed from said aqueous solution. In this method, the temperature at which the solution is subjected to said gas is an important requirement inseparable from the said molar ratio. This temperature is below about 60° C. and above the freezing point of said aqueous solution, but in actual practice a temperature usually in the range of an ambient temperature to 60° C., and in many cases 0° to 60° C., is employed. When the temperature exceeds about 60° C., carbon dioxide comes into the desorbed gas. It is necessary therefore to adjust the operation so that the temperature may not exceed about 60° C. So long as the method is practiced at a temperature in the above-mentioned range, ammonia gas alone is selectively recovered together with the desorption gas, contrary to the above-mentioned technological common knowledge about the desorption of gas.

The desorption gas should be inert to ammonia and carbon dioxide and substantially water-insoluble. As such desorption gas, there are advantageously used air, oxygen, nitrogen and a mixture of more than two of these gases.

In the method of this invention, an aqueous solution containing ammonia and carbon dioxide in which a molar ratio of ammonia to carbon dioxide is more than two is fully contacted with said desorption gas at a temperature specified above by using any conventional means of contacting liquid with gas. As such means, there are employed, for instance, a counter current type multiplate column system, a counter current type pipe system and an agitation mixing system.

Now, with reference to the accompanying drawing, an example of operation by means of a counter current type multiplate column is explained in detail.

The drawing shows an example of the apparatus to be used in the practice of this invention.

An aqueous solution containing ammonia and carbon dioxide in which a molar ratio of ammonia to carbonic dioxide is at least two is fed into the uppermost plate 3 of a desorption column 1 and is contacted with a desorption gas which ascends from the bottom, thereby desorbing part of ammonia dissolved in the aqueous solution. The said aqueous solution from which a part of ammonia has been desorbed comes down onto one plate after another, and while desorbing the dissolved ammonia further, finally reaches the plate at the bottom. In this operation, bubble cap plates may be used. It is preferable that roughly all of the ammonia which is dissolved in the said solution in excess of carbon dioxide is desorbed but, in actual practice, an adjustment is so made that there may be a small amount of residual ammonia in the solution. The aqueous solution from which a fixed amount of ammonia has been desorbed is taken out from a pipe 4 as an aqueous solution at the bottom of the column. The desorption gas is introduced from a pipe 5 located at the bottom of the column.

The aqueous solution is deprived of heat of vaporization while it discharges ammonia in the course of its descending in the desorption column. This results in the lowering of temperature. As the lowering of temperature decreases a desorption effect, it is preferable to take whole or part of the solution on the plate out of the desorption column as occasion demands, to raise its temperature to a desired point below about 60° C. in a heater 2, to return it into the desorption column, and thereby to maintain the interior of the desorption column at a temperature in the specified range suitable for operation. The heater is provided at an appropriate position in the desorption column. Heating may be effected with the provision of an interior heater in the desorption column. Furthermore, not only a solution containing ammonia and carbon dioxide but also the desorption gas may be introduced after preheated to a desired temperature below about 60° C. The operation is performed usually without employing any means for elevating or reducing the pressure, but, if desired, it may be carried out under an elevated or reduced pressure.

This invention is further explained by the examples which follow.

EXAMPLE 1

An aqueous solution containing 24.5 mole percent of ammonia and 2.0 mole percent of carbon dioxide was fed into the uppermost plate of said desorption column and was contacted in counter current with air introduced from the bottom part of the column, thereby desorbing ammonia. Results are shown in Table 3.

TABLE 3

|  | Feed aqueous Solution | | Air | | Recovered gas | | Aqueous solution at bottom of column | |
| --- | --- | --- | --- | --- | --- | --- | --- | --- |
|  | Kg./hr. | Mol percent | Kg./hr. | Mol percent | Kg./hr. | Mol percent | Kg./hr. | Mol percent |
| $NH_3$ | 292.5 | 24.5 | | | 224.5 | 13.87 | 68.0 | 7.0 |
| $CO_2$ | 62.5 | 2.0 | | | 0.44 | 0.01 | 62.06 | 2.5 |
| $H_2O$ | 928.0 | 73.5 | 34.2 | 2.3 | 36.0 | 2.10 | 926.2 | 90.5 |
| Air | | | 2,320.0 | 97.7 | 2,320.0 | 84.02 | | |
| Total | 1,283.0 | 100.0 | 2,354.2 | 100.0 | 2,580.94 | 100.00 | 1,056.26 | 100.0 |

The desorption column was maintained at a pressure of 1.6 atmospheres (absolute pressure) and at a temperature in the range of 20° to 40° C.

EXAMPLE 2

An aqueous solution containing 8.63 mole percent of ammonia and 2.45 mole percent of carbon dioxide gas was fed into the top of a packed column in which no particular heating means was provided and was contacted in counter current with air introduced from the bottom part of the column thereby desorbing ammonia. Results are shown in Table 4.

TABLE 4

|  | Feed aqueous solution | | Air | | Recovered gas | | Aqueous solution at bottom of column | |
| --- | --- | --- | --- | --- | --- | --- | --- | --- |
|  | Kg./hr. | Mol percent | Kg./hr. | Mol percent | Kg./hr. | Mol percent | Kg./hr. | Mol percent |
| $NH_3$ | 85.0 | 8.6 | | | 25.5 | 12.82 | 59.5 | 6.2 |
| $CO_2$ | 62.5 | 2.5 | | | 0.04 | 0.01 | 62.46 | 2.5 |
| $H_2O$ | 928.0 | 88.9 | 3.6 | 2.0 | 3.6 | 1.71 | 928.0 | 91.3 |
| Air | | | 290.0 | 98.0 | 290.0 | 85.46 | | |
| Total | 1,075.5 | 100.0 | 293.6 | 100.0 | 319.14 | 100.00 | 1,049.96 | 100.0 |

The desorption column was maintained at a pressure of 1.6 atmospheres (absolute pressure) and a temperature in the range of 20° to 40° C.

In accordance with this invention, as is clear from the foregoing Examples, the content of ammonia in the recovered gas is exceedingly great as compared with the carbon dioxide. It is possible, therefore, to recover ammonia substantially free from carbon dioxide.

In the foregoing Examples air was used as a desorption gas. The use of air and/or oxygen gives an advantage that a gaseous mixture of recovered ammonia gas and a desorption gas can be used directly as the feed gas for ammoxidation. The method of this invention can be advantageously practiced in combination with a process which forms an aqueous solution containing ammonia and carbon dioxide in which a molar ratio of ammonia to carbon dioxide is more than two or with a process to absorb ammonia preferentially from a gaseous mixture which is generated by heating and decomposing the aqueous solution in which the molar ratio is less than 2. For instance, as the solution at the bottom of the column from which ammonia has been desorbed still contains a considerable amount of ammonia, it is possible to further recover ammonia by combining a method to absorb ammonia preferentially from a gaseous mixture generated upon heating the said aqueous solution at the bottom of the column. The liquid at the bottom of the column which is discharged from the desorption column may be used again as a gas-absorbing solvent directly or in dilution with water.

We claim:

1. A method of recovering ammonia gas from an aqueous solution containing ammonia and carbon dioxide in a molar ration of ammonia to carbon dioxide of from 2:1 to 12.25:1, said aqueous solution being obtained from the production of aromatic nitriles by the ammoxidation of aromatic hydrocarbons, which method comprises concurrently contacting said aqueous solution with a desorption gas selected from the group consisting of air, oxygen, nitrogen and mixtures thereof, at a temperature below about 60° C. and above the freezing point of said aqueous solution, thereby desorbing from said aqueous solution ammonia gas which is substantially free of carbon dioxide.

2. A method of recovering ammonia gas from an aqueous solution containing ammonia and carbon dioxide in a molar ratio of ammonia to carbon dioxide of from 2:1 to 12.25:1, said aqueous solution being obtained upon synthesis of urea from ammonia and carbon dioxide, which method comprises concurrently contacting said aqueous solution with a desorption gas selected from the group consisting of air, oxygen, nitrogen and mixtures thereof, at a temperature below about 60° C. and above the freezing point of said aqueous solution, thereby desorbing from said aqueous solution ammonia gas which is substantially free of carbon dioxide.